United States Patent
Davis et al.

(10) Patent No.: US 7,617,234 B2
(45) Date of Patent: Nov. 10, 2009

(54) XML SCHEMA FOR BINDING DATA

(75) Inventors: Tristan A. Davis, Redmond, WA (US);
Brian M. Jones, Redmond, WA (US);
Ali Taleghani, Redmond, WA (US);
Robert A. Little, Redmond, WA (US);
Marcin Sawicki, Kirkland, WA (US);
Mark Sunderland, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 332 days.

(21) Appl. No.: 11/067,383

(22) Filed: Feb. 25, 2005

(65) Prior Publication Data

US 2006/0195454 A1 Aug. 31, 2006

Related U.S. Application Data

(63) Continuation-in-part of application No. 11/030,423, filed on Jan. 6, 2005.

(51) Int. Cl.
*G06F 17/30* (2006.01)
*G06F 15/16* (2006.01)
(52) U.S. Cl. ................ 707/102; 707/100; 707/101; 707/3
(58) Field of Classification Search ............... 707/100, 707/101
See application file for complete search history.

(56) References Cited

U.S. PATENT DOCUMENTS

| | | | |
|---|---|---|---|
| 5,287,504 A | 2/1994 | Carpenter et al. | 707/201 |
| 5,440,745 A | 8/1995 | Platte et al. | 718/101 |
| 5,630,131 A | 5/1997 | Palevich et al. | 717/108 |
| 5,715,415 A | 2/1998 | Dazey et al. | 715/708 |
| 5,717,741 A | 2/1998 | Yue et al. | 379/88.12 |
| 5,845,299 A | 12/1998 | Arora et al. | 715/209 |
| 5,903,902 A | 5/1999 | Orr et al. | 715/202 |
| 5,910,075 A | 6/1999 | Arnell et al. | 49/25 |
| 5,911,068 A | 6/1999 | Zimmerman et al. | 719/328 |
| 5,974,430 A | 10/1999 | Mutschler et al. | 715/505 |
| 5,991,878 A | 11/1999 | McDonough et al. | 726/9 |
| 6,006,239 A | 12/1999 | Bhansali et al. | 707/201 |
| 6,014,677 A | 1/2000 | Hayashi et al. | 707/104.1 |
| 6,088,431 A | 7/2000 | LaDue | 379/114.2 |

(Continued)

FOREIGN PATENT DOCUMENTS

KR  2004-0020933 A  3/2004

(Continued)

OTHER PUBLICATIONS

Memorandum and four figures regarding StarOffice 5.1; date is unknown, but believed to be earlier than Jan. 5, 2001, 5 pp.

(Continued)

*Primary Examiner*—Cam Y T Truong
(74) *Attorney, Agent, or Firm*—Merchant & Gould P.C.

(57) ABSTRACT

An XML schema is provided allowing data to be stored in a separate location from the presentation surface of an application. By way of the schema, users of the application can establish links (or bindings) between the contents of the data and the presentation surface as part of an XML document format. Methods, systems, and computer-readable medium are described implementing the schema.

14 Claims, 5 Drawing Sheets

U.S. PATENT DOCUMENTS

| | | | | |
|---|---|---|---|---|
| 6,157,940 | A | 12/2000 | Marullo et al. | 703/27 |
| 6,247,020 | B1 | 6/2001 | Minard | 707/104.1 |
| 6,268,851 | B1 | 7/2001 | Bricklin et al. | 715/744 |
| 6,275,824 | B1 | 8/2001 | O'Flaherty et al. | 707/9 |
| 6,317,777 | B1 | 11/2001 | Skarbo et al. | 709/294 |
| 6,397,351 | B1 | 5/2002 | Miller et al. | 714/13 |
| 6,457,002 | B1 | 9/2002 | Beattie et al. | 707/3 |
| 6,490,601 | B1 | 12/2002 | Markus et al. | 715/507 |
| 6,507,856 | B1 | 1/2003 | Chen et al. | 715/205 |
| 6,562,076 | B2 | 5/2003 | Edwards et al. | 715/229 |
| 6,571,253 | B1 | 5/2003 | Thompson et al. | 707/103 R |
| 6,629,843 | B1 | 10/2003 | Bunting et al. | 434/118 |
| 6,731,314 | B1 | 5/2004 | Cheng et al. | 715/848 |
| 6,859,821 | B1 | 2/2005 | Ozzie et al. | 709/205 |
| 6,865,599 | B2 | 3/2005 | Zhang | 709/218 |
| 6,920,455 | B1 * | 7/2005 | Weschler | 707/100 |
| 6,944,622 | B1 | 9/2005 | Mitchell et al. | 707/102 |
| 6,944,662 | B2 | 9/2005 | Devine et al. | 709/225 |
| 6,950,990 | B2 | 9/2005 | Rajarajan et al. | 715/736 |
| 6,996,769 | B1 | 2/2006 | Peikes et al. | 715/512 |
| 7,017,112 | B2 * | 3/2006 | Collie et al. | 715/513 |
| 7,035,839 | B1 | 4/2006 | Gillespie et al. | 707/2 |
| 7,039,708 | B1 | 5/2006 | Knobl et al. | 709/227 |
| 7,039,863 | B1 | 5/2006 | Caro et al. | 715/530 |
| 7,085,773 | B2 | 8/2006 | Dorsett, Jr. | 707/104.1 |
| 7,111,284 | B2 | 9/2006 | Takagi et al. | 707/E17.006 |
| 7,117,504 | B2 | 10/2006 | Smith et al. | 719/328 |
| 7,200,816 | B2 | 4/2007 | Falk et al. | 715/762 |
| 7,237,002 | B1 | 6/2007 | Estrada et al. | 709/203 |
| 7,340,481 | B1 | 3/2008 | Baer et al. | 707/104.1 |
| 7,386,563 | B1 | 6/2008 | Pal | 707/102 |
| 7,509,305 | B2 | 3/2009 | Tozawa et al. | 707/3 |
| 2001/0056463 | A1 | 12/2001 | Grady et al. | 709/203 |
| 2002/0010716 | A1 | 1/2002 | McCartney et al. | 707/517 |
| 2002/0013792 | A1 | 1/2002 | Imielinski et al. | 707/523 |
| 2002/0065110 | A1 | 5/2002 | Enns et al. | 455/566 |
| 2002/0085020 | A1 | 7/2002 | Carroll, Jr. | 345/700 |
| 2002/0107867 | A1 | 8/2002 | Takagi et al. | 707/102 |
| 2002/0133516 | A1 | 9/2002 | Davis et al. | 707/513 |
| 2002/0161801 | A1 | 10/2002 | Hind et al. | 715/239 |
| 2002/0198962 | A1 | 12/2002 | Horn et al. | 709/219 |
| 2003/0007009 | A1 | 1/2003 | Haley | 345/805 |
| 2003/0018666 | A1 | 1/2003 | Chen et al. | 715/234 |
| 2003/0018714 | A1 | 1/2003 | Mikhailov et al. | 709/203 |
| 2003/0023632 | A1 | 1/2003 | Ries et al. | 715/235 |
| 2003/0023953 | A1 | 1/2003 | Lucassen et al. | 717/106 |
| 2003/0051054 | A1 | 3/2003 | Redlich et al. | 709/246 |
| 2003/0097457 | A1 | 5/2003 | Saran et al. | 709/230 |
| 2003/0159111 | A1 | 8/2003 | Fry | 715/513 |
| 2003/0163603 | A1 | 8/2003 | Fry et al. | 709/328 |
| 2003/0164859 | A1 | 9/2003 | Evans | 345/792 |
| 2003/0174162 | A1 | 9/2003 | Wu | 345/736 |
| 2004/0021679 | A1 | 2/2004 | Chapman et al. | 345/700 |
| 2004/0073565 | A1 | 4/2004 | Kaufman et al. | 707/101 |
| 2004/0088332 | A1 | 5/2004 | Lee et al. | 707/200 |
| 2004/0088647 | A1 | 5/2004 | Miller et al. | 715/500 |
| 2004/0103147 | A1 | 5/2004 | Flesher et al. | 709/204 |
| 2004/0111672 | A1 * | 6/2004 | Bowman et al. | 715/513 |
| 2004/0153467 | A1 | 8/2004 | Conover et al. | 707/100 |
| 2004/0183830 | A1 | 9/2004 | Cody et al. | 715/747 |
| 2004/0199876 | A1 | 10/2004 | Ethier et al. | 715/513 |
| 2004/0205653 | A1 | 10/2004 | Hadfield et al. | 715/530 |
| 2004/0217985 | A9 | 11/2004 | Ries et al. | 715/740 |
| 2004/0220926 | A1 | 11/2004 | Lamkin et al. | 707/3 |
| 2004/0225958 | A1 | 11/2004 | Halpert et al. | 715/513 |
| 2004/0237036 | A1 | 11/2004 | Quist et al. | 715/513 |
| 2004/0243938 | A1 | 12/2004 | Weise et al. | 715/526 |
| 2004/0268240 | A1 | 12/2004 | Vincent | 715/513 |
| 2005/0027618 | A1 | 2/2005 | Zucker et al. | 705/26 |
| 2005/0033667 | A1 | 2/2005 | Sugimoto et al. | 705/28 |
| 2005/0033766 | A1 | 2/2005 | Pang et al. | 707/104.1 |
| 2005/0034079 | A1 | 2/2005 | Gunasekar et al. | 715/753 |
| 2005/0044145 | A1 | 2/2005 | Quinn et al. | 709/205 |
| 2005/0050066 | A1 | 3/2005 | Hughes | 707/100 |
| 2005/0068913 | A1 | 3/2005 | Tan et al. | 370/310 |
| 2005/0071477 | A1 | 3/2005 | Evans et al. | 709/228 |
| 2005/0076295 | A1 | 4/2005 | Simske et al. | 715/517 |
| 2005/0086384 | A1 | 4/2005 | Ernst | 709/248 |
| 2005/0091346 | A1 | 4/2005 | Krishnaswami et al. | 709/220 |
| 2005/0091576 | A1 | 4/2005 | Relyea et al. | 715/502 |
| 2005/0114771 | A1 | 5/2005 | Piehler et al. | 715/536 |
| 2005/0183001 | A1 | 8/2005 | Carter et al. | 715/501.1 |
| 2005/0187973 | A1 | 8/2005 | Brychell et al. | 707/104.1 |
| 2005/0188349 | A1 | 8/2005 | Bent et al. | 717/106 |
| 2005/0188350 | A1 | 8/2005 | Bent et al. | 717/106 |
| 2005/0289457 | A1 | 12/2005 | Obasanjo et al. | 715/513 |
| 2006/0031755 | A1 | 2/2006 | Kashi | 715/512 |
| 2006/0036692 | A1 | 2/2006 | Morinigo et al. | 709/206 |
| 2006/0041558 | A1 | 2/2006 | McCauley et al. | 707/10 |
| 2006/0048112 | A1 * | 3/2006 | Thiagarajan et al. | 717/144 |
| 2006/0053158 | A1 | 3/2006 | Hall et al. | 707/102 |
| 2006/0053194 | A1 | 3/2006 | Schneider et al. | 709/204 |
| 2006/0069987 | A1 | 3/2006 | Jones et al. | 715/520 |
| 2006/0069989 | A1 | 3/2006 | Jones et al. | 715/526 |
| 2006/0080590 | A1 | 4/2006 | Jones et al. | 715/500 |
| 2006/0136441 | A1 | 6/2006 | Fujisaki | 707/101 |
| 2006/0150085 | A1 | 7/2006 | Davis et al. | 715/513 |
| 2006/0195413 | A1 | 8/2006 | Davis et al. | 707/1 |
| 2006/0195454 | A1 | 8/2006 | Davis et al. | 707/100 |
| 2006/0195777 | A1 | 8/2006 | Davis et al. | 715/500 |
| 2006/0195783 | A1 | 8/2006 | Davis et al. | 715/513 |
| 2006/0282452 | A1 | 12/2006 | Takagi et al. | 707/101 |
| 2007/0061382 | A1 | 3/2007 | Davis et al. | 707/201 |

FOREIGN PATENT DOCUMENTS

| | | |
|---|---|---|
| KR | 2004-0034327 A | 4/2004 |
| WO | WO 01/08033 A2 | 2/2001 |
| WO | WO 01/08033 A3 | 2/2001 |
| WO | WO 01/11486 A2 | 2/2001 |
| WO | WO 01/11486 A3 | 2/2001 |
| WO | WO 01/15004 A2 | 3/2001 |
| WO | WO 01/95515 A2 | 12/2001 |
| WO | WO 01/95515 A3 | 12/2001 |

OTHER PUBLICATIONS

Habraken, Jr., StarOffice 5.2 Cale Handbook, Prentice Hall, Dec. 2000, Chapter 2, 5 pp.

Comai et al., "Computing Graphical Queries Over XML Data", ACM Transactions on Information Systems TOIS, Oct. 2001, ACM Press, vol. 19 No. 4,371-430 pp.

Leslie, "Using Javadoc and XML to Produce API reference Documentation", SIGDOC '02, 23 Oct. 2002, AMC Press, pp. 104-109.

Sun et al., "Operational Transformation for Collaborative Word Processing", Proceedings of the Conference of CSCW'04, Nov. 10, 2004, ACM Press, pp. 437-446.

Altova, "xmlspy5: User & Reference Manual", Jan 3, 2003, www.altova.com, pp. 13-30, 698-701, 890.

McKenzie et al., "XFA Template Version 1.0", http://www.w3.org/1999/05/XFA/xfa-template, retrieved on May 30, 2008, 60 pgs..

Heslop et al., "Word 2003 Bible", Wiley Publishing, 2003, pp. 441-443.

European Search Report dated Dec. 19, 2007 in EP 05112126.7.
European Search Report dated Dec. 19, 2007 in EP 05112131.7.
European Examination Report dated Mar. 3, 2008 in EP 05112131.7.
European Examination Report dated Mar. 3, 2008 in EP 05112126.7.
European Examination Report dated Jun. 12, 2008 in EP 05105427.8.

Official Action in U.S. Appl. No. 10/955,612, dated Sep. 19, 2006.
Official Action in U.S. Appl. No. 11/030,423, dated Nov. 22, 2006.
Official Action in U.S. Appl. No. 11/030,423, dated May 15, 2007.
Official Action in U.S. Appl. No. 11/066,083, dated Jun. 4, 2007.
Official Action in U.S. Appl. No. 11/066,117, dated Jun. 21, 2007.
Official Action in U.S. Appl. No. 11/067,383, dated Jun. 28, 2007.

Official Action in U.S. Appl. No. 11/030,423, dated Oct. 4, 2007.
Official Action in U.S. Appl. No. 11/066,117, dated Feb. 15, 2008.
Official Action in U.S. Appl. No. 10/955,612, dated Mar. 10, 2008.
Official Action in U.S. Appl. No. 11/066,083, dated Mar. 11, 2008.
Official Action in U.S. Appl. No. 11/030,423, dated Jul. 10, 2008.
U.S. Official Action dated Jun. 13, 2008 in U.S. Appl. No. 11/065,754.
Souchon et al.; "A Review of XML-compliant User-interface Description Languages"; LNCS, copyright Springer-Verlag 2003, pp. 377-391.
Meyer, "aTool-Creating Validated XML Documents on the Fly Using MS Word"; SIGDOC, copyright Oct. 2002, ACM, P. 113-121.
U.S. Appl. No. 11/030,423, filed Jan. 6, 2005, entitled "Data Binding in a Word-Processing Application".
U.S. Appl. No. 11/065,754, filed Feb. 5, 2005, entitled "Method and Apparatus for Utilizing an Object Model for Managing Content Regions in an Electronic Document".
U.S. Appl. No. 11/066,058, filed Feb. 25, 2005, entitled "Method and Apparatus of Utilizing an Extensible Markup Language Schema for Managing Specific Types of Content in an Electronic Document".
U.S. Appl. No. 11/066,083, filed Feb. 25, 2005, entitled "Progammability for Binding Data".
U.S. Appl. No. 11/066,117, filed Feb. 25, 2005, entitled "Data Store for Software Application Documents".
Chinese First Office Action dated May 9, 2008 cited in Chinese Application No. 200510088514.8.
Sun_Micro, How to Write Doc Comments for the Javadoc Tool, Sep. 2004, pp. 1-16.
Sala, et al., ML 3.0 Smoothed Aggregation User's Guide, Computational Math and Algorithms, Sandia Notational Laboratories, May 2004, pp. 3-66.
Official Action in U.S. Appl. No. 10/955,612, dated Dec. 3, 2008.
Official Action in U.S. Appl. No. 10/955,612, dated May 18, 2007.
Official Action in U.S. Appl. No. 11/065,754, dated Jan. 22, 2009.
Official Action in U.S. Appl. No. 11/030,423, dated Feb. 18, 2009.
European Search Report dated Mar. 31, 2006 in EP 06100594.8.
Chinese First Office Action dated Jul. 4, 2008 in 200510128896.2.
Chinese Second Office Action dated Nov. 21, 2008 in 200510088514.8.
Chinese First Office Action dated Nov. 7, 2008 in 200610007194.3.
Ladd et al., "Using HTLM, 4, XML and Java 1.2", Que, Platinum Edition, Dec. 1998, pp. 693-701.
Narravula et al., "Supporting Strong Coherency for Active Caches in Multi-Tier Data-Centers over InfiniBand", ANL.gov, 2004, pp. 1-10 (retrieved from CiteseerX May 5, 2009).
Narravula et al., "Designing Efficient Cooperative Caching Schemes for Multi-Tier Data-Centers over RDMA-enabled Networks", OCU-CISRC-6/05-TR39, Jun. 2005, pp. cover page, 1-10 (retrieved from Internet May 5, 2009).
Official Action in U.S. Appl. No. 11/331,586, dated Jul. 26, 2007.
Official Action in U.S. Appl. No. 11/332,468, dated Dec. 17, 2007.
Official Action in U.S. Appl. No. 11/331,586, dated Dec. 27, 2007.
Official Action in U.S. Appl. No. 11/332,468, dated Jul. 18, 2008.
Official Action in U.S. Appl. No. 11/331,586, dated Sep. 29, 2008.
Official Action in U.S. Appl. No. 11/332,468, dated Mar. 11, 2009.
Official Action in U.S. Appl. No. 11/066,177, dated Apr. 8, 2009.
Official Action in U.S. Appl. No. 11/066,058, dated Apr. 13, 2009.
Official Action in U.S. Appl. No. 11/331,586, dated May 12, 2009.
PCT Search Report dated Jan. 16, 2007 in PCT/US2006/034802.
PCT Search Report dated Mar. 12, 2007 in PCT/US2006/034974.
European Communication dated May 13, 2009 in EP 05105427.8.
Official Action in U.S. Appl. No. 10/955,612, dated Jun. 25, 2009.
Chinese Third Office Action dated Jun. 5, 2009 in 200510088514.8.
Official Action in U.S. Appl. No. 11/065,754, dated Jul. 8, 2009.
Chinese First Office Action dated Jul. 24, 2009 in 200680033069.8.
Chinese First Office Action dated Aug. 28, 2009 in 200680033162.9.

\* cited by examiner

XML SCHEMA FOR BINDING DATA

CROSS-REFERENCE TO RELATED APPLICATIONS

This application is a continuation-in-part of U.S. application Ser. No. 11/030,423, owned by Microsoft Corporation and filed with the United States Patent and Trademark Office on Jan. 6, 2005, entitled "Data Binding in a Word Processing Application," which is herein incorporated by reference in its entirety.

This application is related to U.S. application Ser. No. 11/065,754, entitled "Method and Apparatus for Utilizing an Object Model for Managing Content Regions in an Electronic Document," and U.S. application Ser. No. 11/066,058, entitled "Method and Apparatus for Utilizing an Extensible Markup Language Schema for Managing Specific Types of Content in an Electronic Document", each owned by the Microsoft Corporation, filed concurrently herewith and incorporated in their entireties."

BACKGROUND OF THE INVENTION

Markup Languages have attained wide popularity in recent years. One type of markup language, Extensible Markup Language (XML), is a universal language that provides a way to identify, exchange, and process various kinds of data. For example, XML is used to create documents that can be utilized by a variety of application programs. Elements of an XML file typically have an associated namespace and schema.

A namespace is a unique identifier for a collection of names that are used in XML documents to define element/attribute names and types. The name of a namespace is commonly used to uniquely identify each class of XML document. The unique namespaces differentiate markup elements that come from different sources and happen to have the same name.

XML Schemata provide a way to describe and validate data in an XML environment. A schema states what elements and attributes are used to describe content in an XML document, where each element is allowed, what types of content is allowed within it and which elements can appear within which other elements. The use of schemata ensures that the document is structured in a consistent and predictable manner. Schemata may be created by a user and generally supported by an associated markup language, such as XML. By using an XML editor, the user can manipulate the XML file and generate XML documents that adhere to the schema the user has created. In previous word processor applications, support for custom XML schemas was added to the application, enabling users to 'tag' contents of a document with custom XML markup (e.g. <title>), essentially giving semantic meaning to what was previously an unclassified run of text. This meant that a document, which was previously just text with formatting, but no meaning for other applications to process, could now be a structured XML document containing specific pieces of XML markup from any user-defined XML schema that any other XML-aware application could locate and understand.

In a basic example, the text at the top of a document could be 'tagged' as a title with a <title> XML element from a user-defined XML schema, which means that other XML-aware applications can now easily understand that this range of text contains a "title" and extract it appropriately. This enables a backend process to intelligently extract parts of the document with appropriate semantics and context (e.g. this text is the <title>).

However, the drawbacks associated with prior word processor applications stem from the fact that the addition and persistence of custom XML markup is tied to the presentation of the document. That is, in the existing implementations there is an inexorable link between the XML markup of a word processor document (for example, the details of a customer invoice expressed in XML format) and its presentation on the document surface (three paragraphs of plain text followed by a table with 5 columns and 4 rows w/ a specific table style, for example). Therefore, the XML data represented in prior word processor applications (because it is tied to the presentation) must coincide exactly with the content of the document. For example, if the XML schema for the invoice states that <date> comes before <address>, which comes before <phoneNumber>, then those three XML elements must appear in exactly that order as presented in the document. This means that changes to the presentation format (e.g. moving a table row around which contains <date>) will also cause changes to the structure of the XML data contained in that document, which requires extra steps on the part of the solution developer to ensure this data conforms to the structure of the associated XML schema. Thus, the end user of the document is not afforded the freedom to manipulate the presentation freely, because doing so might invariably change the semantics of the data, potentially violating the XML schema for that data.

Additionally, solutions developed on top of prior word processor applications need to more carefully consider the implications of the presentation when attempting to read/write data from a document for a backend application. So, if a paragraph of bold text is tagged as a title, the resulting XML saved by prior word processor applications would look like:

```
<w:p>
  <Title>
    <w:r>
      <w:rPr>
        <w:b/>
      </w:rPr>
      <w:t>This is the title.</w:t>
    </w:r>
  </Title>
<w:p>
```

As shown above, the custom XML tagging is surrounded on both sides by XML tags that are very specific to the prior word processor application—in this example, w:p, w:r, etc. This means that a XML-aware solution which is processing this data must not only understand its own data format (which contains the <Title> element), but must also understand the exact details of the prior word processor application formatting, so it knows to traverse and ignore that information as it is searching for its own data. Accordingly, this kind of implementation still imposes some requirements on the user, because small changes in the look of the text in the document (for example, dragging the contents of the <Title> element into a table cell, etc.) can result in significant changes the location of the custom XML tags within the surrounding word processor's native tags. Thus, a programmer/code developer often needs to write additional code to anticipate and understand where the prior word processor applications is going to put the custom XML elements based on the presentation and deal with all of the various permutations. This means the resulting solution may still need to contain significant logic code for dealing with specific prior word processor application needs.

Programmers/code developers working with the prior word processor applications also need to take into consideration the implications of a document's layout format when considering reading and writing operations. For example, a user might attempt to grab the value of a <StockSymbol> element and use it to place the full name of a company in the <CompanyName> element in the same document as a simple enhancement for a user writing a company report. To maintain the document's integrity, the user needed to consider, both on the reading and writing of the desired data from the document, the current layout format of the document before they could write functional code to perform these actions. For example, the user might need to know if the value they were writing was in a table cell, a bulleted list, etc., in order to construct the prior word processor application's formatting information that, when inserted into the document, would produce the desired result. This is another potential reason for additional coding in order to understand the word processor application's presentation semantics.

Yet another limitation of prior word processor applications is that XML elements' editing behaviors can sometimes be perceived as "fragile." This is partly because, as discussed above, they are limited by the fact that the positioning of the tags on the document surface determines the structure of the XML data based on the user defined schema. Accordingly, a number of issues may arise. First, typical user operations (e.g. copy/paste from one section to another) may alter the XML structure and render the document invalid according to the associated XML schema. Second, in such word processor implementations, all elements required by the customer-defined XML schema need to be included in some form on the document surface. This means that developers may have a hard time creating associated XML data as a method for carrying around additional information about the document which is not displayed on the document surface, but serves more as metadata. And, third, elements which are semantically unnecessary on the document surface (e.g. non leaf elements which are not marking up mixed content) need to be included as well in such word processor implementations, further increasing the ability of common user operations to modify the XML data.

In many cases, the schema which defines the XML data (for example, the data that comprises a memo document) tends to be rigidly defined by a single standards body in order to facilitate the communication of this data between multiple heterogeneous processing systems. However, in so facilitating the backend communication, often the human readability and editability of the document data is sacrificed, which making it difficult for a user to understand and parse this data. For example, the XML standard might define a standard format for dates, such as: dd-mm-yyyyThh:mm:ss.ssss. All dates are required to be represented in this format to be parsed by XML-aware applications. Obviously, this format is hard for the user to enter correctly, and often clashes with the way in which the user typically enters dates (e.g. many locales typically use mm-dd-yyyy instead of dd-mm-yyyy, etc.).

Thus, what is needed is a way to enable developers to separate the XML data and the presentation of such data in an application, such as a word processor application.

SUMMARY OF THE INVENTION

Embodiments of the invention provide a word processor application, including a schema, for creating word processor documents wherein the data and presentation can be separated. More particularly, data can be entered into and extracted from a word processor document which is stored in a separate location from the presentation format of the word processor document. According to embodiments of the invention, users of the word processor application can create a separate storage location for the word processor document data and establish links (or bindings) between the contents of that data and the presentation surface. According to embodiments of the invention, a computer-readable medium, method, and system utilize a schema for binding data. The schema includes a data binding element and associated properties for binding data between a data store and one or more content regions.

DETAILED DESCRIPTION OF PREFERRED EMBODIMENTS

Figure 1:
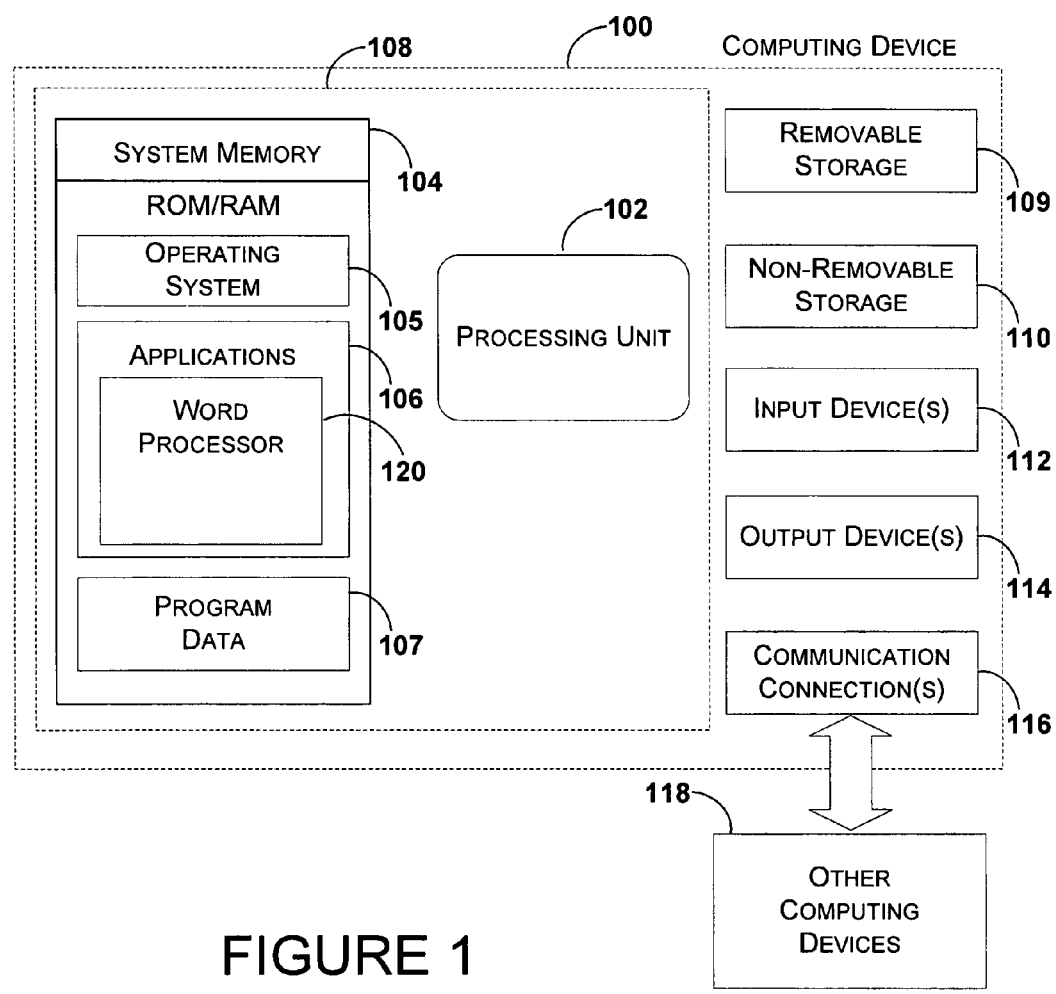
FIG. 1 illustrates an exemplary computing device that may be used in one exemplary embodiment of the present invention.

Throughout the specification and claims, the following terms take the meanings explicitly associated herein, unless the context clearly dictates otherwise.

The term "data" refers to any supplementary information which is carried with, referred to, or used by the word processor document. This information is often large and is likely not exposed on the presentation layer of the document in its entirety.

The terms "markup language" or "ML" refer to a language for special codes within a document that specify how parts of the document are to be interpreted by an application. In a word processor file, the markup language specifies how the text is to be formatted or laid out.

The term "element" refers to the basic unit of an XML document. The element may contain attributes, other elements, text, and other content regions for an XML document.

The term "presentation" refers to the visible portion of the document—the text and layout that would appear if the document were printed.

The term "tag" refers to a character inserted in a document that delineates elements within an XML document. Each element can have no more than two tags: the start tag and the end tag. It is possible to have an empty element (with no content) in which case one tag is allowed.

The XML content between the tags is considered the element's "children" (or descendants). Hence other elements embedded in the element's content are called "child elements" or "child nodes" or the element. Text embedded directly in the content of the element is considered the element's "child text nodes". Together, the child elements and the text within an element constitute that element's "content".

The term "attribute" refers to an additional property set to a particular value and associated with the element. Elements may have an arbitrary number of attribute settings associated with them, including none. Attributes are used to associate additional information with an element that will not contain additional elements, or be treated as a text node.

The term "content region" refers to a bounded and/or optionally labeled region of a document which serves as a container for a type of content entered by a user. See "Methods, System, and Computer-Readable Medium For Managing Specific Types of Content In An Electronic Document," filed on Sep. 30, 2004 and assigned U.S. Ser. No. 10/955,612, by the present assignee, which is hereby incorporated by reference in its entirety.

"XPath" is an operator that uses a pattern expression to identify nodes in an XML document. An XPath pattern is a slash-separated list of child element names that describe a path through the XML document. The pattern "selects" elements that match the path.

The term "data store" refers to a container within the word processor document which provides access for storage and modification of the data (in XML format, for example) stored in the word processor document while the file is open.

The term "data binding" refers to a property on a content region which determines the XPath location in one or more pieces of XML data inside a word processor document where the contents of the content region may be stored. As used herein:

"ref"—refers to a unique integer for each bound XML document used by the individual bindings;

"ID"—refers to the unique ID used for identifying specific XML data within the XML data store;

"selectionNamespaces"—refers to the prefix mappings (which associate a namespace with a short abbreviation) for the associated XML document in the XML data store; and, "rootURI"—refers to the root namespace of associated XML document in the XML data store.

Illustrative Operating Environment

Embodiments of the invention provide a word processor application for creating word processor documents wherein the storage of XML data and presentation can be separated. More particularly, data which can be entered into and extracted from a word processor document is stored in a separate location from the presentation format of the word processor document. Accordingly, users of the word processor application can create a separate storage location for the XML data contained within a word processor document and establish links (or bindings) between the contents of that data and the presentation surface, enabling the user to edit the associated XML data by editing the contents of the presentation, but by the same token, preventing the user from changing the structure of the associated XML data. For example, the data for an invoice can be stored separately as XML in the word processor file format so that moving around the positions of the links in the document does not change the structure of the separate data store. Thus, backend processing of this structured data is made easier, as the data now has a known structure which is unaffected by the way the user edits the document. A user can edit the data, format the data, including rich presentation formatting, etc. in the word processor document, and only the changes to the text content is 'pushed' back to the XML data stored behind the document. According to the invention, however, all the data updated that are made via user interaction with the word processor document are available in an original native stream of XML. The invention therefore also enables the modification of the contents of a word processor document by directly changing the linked XML data without having to deal with the complexity of the presentation format of that data, which again can be constantly changing. In so doing, it greatly simplifies the addition, editing, and extraction of structured data in a word processor document.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a word processor application 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or magnetic tape. Such additional storage is illustrated in FIG. 1 by removable storage 109 and non-removable storage 110. Computer storage media may include volatile and nonvolatile, removable and non-removable mediums implemented in any method or technology for storage of information, such as computer readable instructions, data structures, program modules, or other data. System memory 104, RAM, ROM and CD-ROM are all examples of computer storage medium. Computer storage media includes, but is not limited to, EEPROM, flash memory or other memory digital versatile disks (DVD) or other optical storage, magnetic cassettes, magnetic tape, magnetic disk storage or other magnetic storage devices, or any other storage medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, 15 data structures, program modules, or other data in a modulated data signal, such as a carder wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

A number of program modules and data files may be stored in the system memory 104 of the computing device 100, including an operating system 105 suitable for controlling the operation of a networked personal computer, such as the WINDOWS XP operating system from MICROSOFT Corporation of Redmond, Wash. System memory 104 may also store one or more program modules, such as word processor application 120, and others described below. Word processor application 120 is operative to provide functionality for creating, editing, and processing electronic documents.

According to one embodiment of the invention, the word processor application 120 comprises the WORD program from MICROSOFT Corporation. It should be appreciated, however, that word processor application programs from other manufacturers may be utilized to embody the various aspects of the present invention. It should further be appreciated that the various aspects of the present invention are not limited to word processor application programs but may also utilize other application programs 106 which are capable of processing various forms of content (e.g. text, images, pictures, etc.), such as spreadsheet application programs, database application programs, presentation application programs, drawing or computer-aided application programs, etc.

Embodiments of the invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Binding Data in a Word Processor Application

Figure 2:
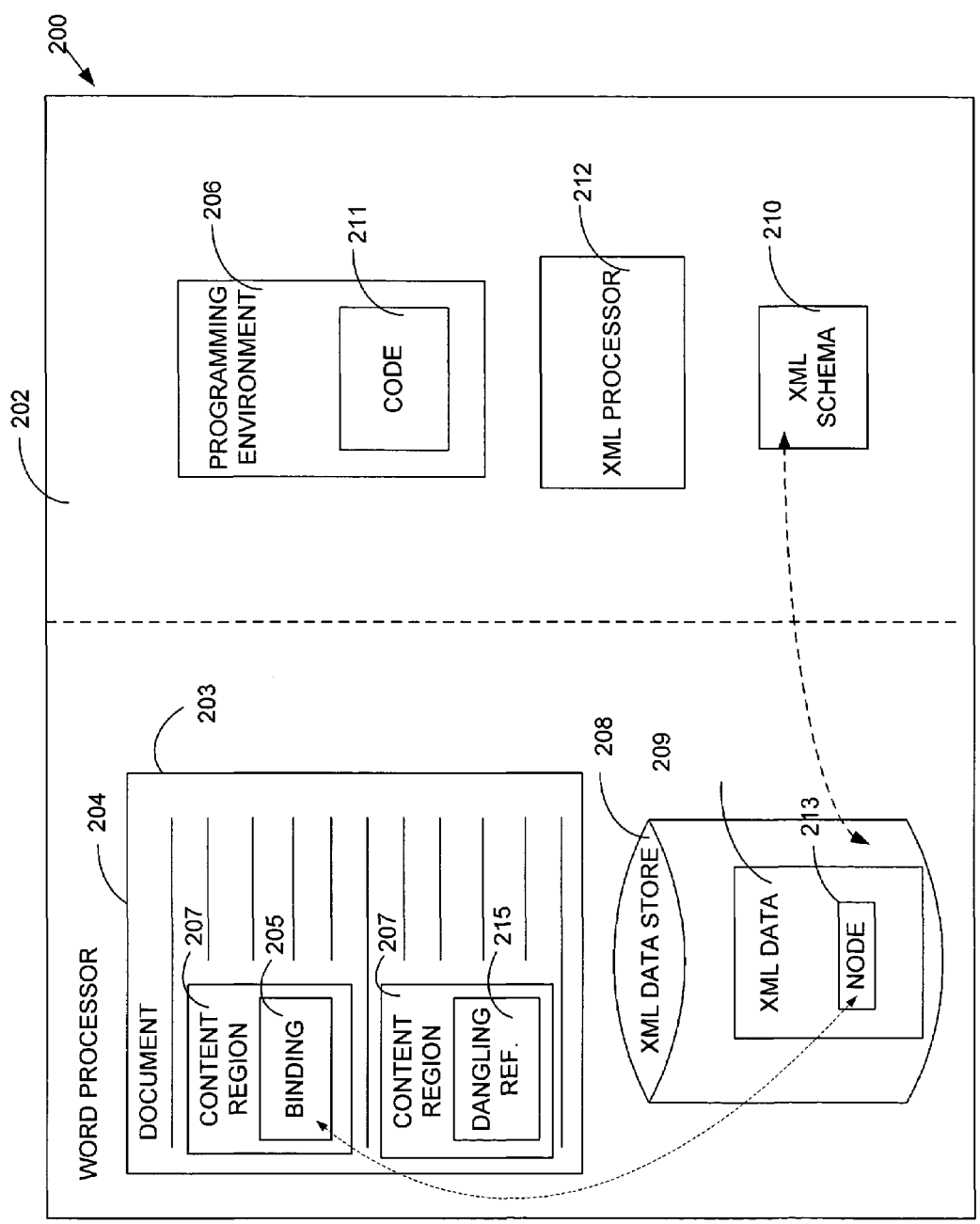
FIG. 2 is a block diagram illustrating an exemplary environment for practicing the present invention.

FIG. 2 is a block diagram illustrating an exemplary environment for practicing embodiments of the present invention. The exemplary environment shown in FIG. 2 is a word processor environment 200 that includes a word processor application 202, word processor document 204, programming environment 206, data store 208, schema file 210, and XML processing module 212. However, as described above, the invention is also applicable to other application programs 106 capable of processing various forms of content (e.g. text, images, pictures, etc.), such as spreadsheet application programs, database application programs, presentation application programs, drawing or computer-aided application programs, and others. The programming module 206 can provide a simple application programming interface (API) for the XML processing module 212, which allows the development of code that modifies the content of either the document 204 or the XML data store 208 contents. It will be appreciated that the invention is not intended to be limited by any particular embodiments or examples described herein. For example, the word processor environment may include a plurality of word processor documents 204, data stores 208, and/or schema files 210. According to an embodiment of the invention, the XML processing module 212 is used by word processor application 202 for processing data formatted according to the Extensible Markup Language. A suitable XML processing module 212 is MSXML manufactured and marketed by MICROSOFT Corporation of Redmond, Wash.

The word processor application 202 includes its own namespace or namespaces and a schema 210, or a set of schemas, that is defined for use with document(s) 204 associated with word processor application 202. The set of tags and attributes defined by the schema 210 for word processor application 202 define the format of document 204. As described below, and according to embodiments of the invention, the data store 208 may include data 209. Preferably, the schema 210 is attached to the data 209 within the data store 208. The word processor document 204 also includes content regions 207 created by a user, as described below. More than one data store 208, associated XML data 209 and schema 210 may be included as part of the word processor application 202. In order to provide XML data 209 with a set of grammatical and data type rules governing the types and structure of data that may be included in a given XML data 209, one or more XML schema 210 may be associated with the XML data 209 for providing the rules governing each of the XML elements and tags with which the user may annotate the given XML data 209. The schema 210 includes the rules governing the order with which those elements may be applied to the XML data 209 and specific rules associated with individual elements applied to the XML data 209.

Embodiments of the invention provide a word processor application 202 operable to create word processor documents 204 wherein the data and presentation can be separated via the presence of a separate data store 208 which is stored with the word processor document. More particularly, data which can be entered into and extracted from a word processor document 204 is stored in one or more XML data 209 files within the document's data store 208, thereby separating the data from the presentation format of the word processor document 204. Accordingly, users of the word processor application 202 can create a separate storage location for the data of a word processor document 204 and establish links (or bindings) 205, associated with one or more content regions 207, between the contents of that data and the presentation surface 203, enabling the user to edit the data by editing the contents of the presentation, but by the same token, preventing the user from changing the structure of the data 209. Moving around positions of the content regions 207 in the document 204 does not change the structure of the XML data 209 in the separate data store 208. Moreover, changes made to the data presentation, bold, italic, justification, etc. do not affect the data structure. Thus, backend processing of the structured data is simplified since the XML data 209 corresponds to a known structure which is unaffected by the way a user edits the document 204.

Embodiments of the invention enable the modification of the contents of a word processor document 204 by directly changing the linked data without having to deal with the complexity of the presentation format, which can be constantly changing. In so doing, it greatly simplifies the addition, editing, and extraction of structured data in a word processor document 204. Moreover, data bindings 205 bound to structured XML data 209 may be moved around in the document 204 without affecting the structure of the data. The data bindings 205 on the content regions 207 are preferably enabled using an XPath expression, which may be defined via a user interface or programming window 206.

A user uses the XPath expression (a standard XML method for identifying a node 213 in an XML tree) to uniquely identify a desired XML node 213 which the document content region should be bound to. The word processor application 202 operates to automatically parse and use the XPath to locate the desired target for the data binding region. This also means that developers familiar with the XPath standard can leverage this use of XML to create data bindings 205 which are semi-dynamic in nature. That is, identifying a different target node 213 based on other changes to the data 209 or changes to the presentation 203. For example, suppose a user wants to display the name of the employee who has completed the most sales in a given time period. If this information was in the XML data 209 associated with a document 204, a user can create an XPath expression which links to the name of the individual with the highest number of completed specifications, and that link automatically shifts to the appropriate location (node 213) as the data changes. The link can also be changed between nodes 213 through the use of code 211, the user interface, or a programming environment 206.

Alternatively, a user can create a data binding which uniquely identifies the object representing node 213 in the data 209 which the document content region 207 may be bound to. The word processor application 202 operates to automatically determine the XPath to locate the desired target for the data binding region. However, this means that in this case, the data binding 205 will have its XPath updated automatically to ensure that the data binding 205 points at the same object, as opposed to the same XPath expression.

Programming code 211, as described briefly above, may be developed to utilize the XML processing module 212 and react to changes moving in either direction (i.e. from a content region 207 on the document surface 203 to a node 213 in the XML data 209 in the data store 208, and vice versa). A user can develop code 211 that defines relationships between the document surface 203 and specific content within the data store 208. Moreover, code 211 can be developed that reacts to changes within a bound region of the document 204 or within the data store 208, trapping or intercepting events, such as edits, additions, deletions, etc. For example, suppose a user wants to ensure that not more than one document can use a specific title. The code 211, based on what is input into the title node, might check against a central database whether the title is already being used. If the title is taken, the code 211 may prompt the user to enter another title and/or alert the user that the title is unavailable. Embodiments of the invention enable a user to write code 211 a single time with the associated XML, and the code is now portable to all document types that support the use of XML constructs without worrying about the exact semantics of the target application, thereby greatly simplifying and streamlining application development.

According to embodiments of the invention, a word processor document 204 may be tagged with content regions 207 representing semantics for specific regions of text (e.g. Title, Body, etc.) and by adding a data binding 205 the associated text within that content region 207 is now stored in a node 213 inside some XML data 209 in the data store 208 within the document 204. The data 209 is linked to the content region 207 in the document, i.e. tagged regions, using one or more data bindings 205. Accordingly, data 209 can now be stored in a consistent location ("data store") in its own XML stream regardless of where the data binding 205 locates the associated content in the presentation 203, i.e. the digital representation that a user interacts with when editing a particular document (e.g. a WORD window depicting a particular user document) of the document 204 or how that data 209 is presented. Thus, a user does not have to worry about data being moved around in the document 204, because the XML data 209 is now located within the data store 208 in a consistent location. Moreover, the data store 208 can contain data 209 which is not referenced by a data binding 205 within a document 204. The "extra" data, such as metadata, etc., provides additional information to users, such as solution developers, which may not be relevant to the document user.

According to embodiments of the invention, the structure of the data is kept in a separate location, one or more pieces of XML data 209 within the document's data stores 208, thereby enabling the user to move around links (i.e. data bindings 205) in the presentation 203, without affecting the data structure. Accordingly, the structure of the XML data 209 does not change, just the presentation of the XML data 209 associated with the word processor document 204 changes. Thus, changing the format of the data presentation in the document 204, does not affect the structure of the data store 208. The user is not moving the actual data 209 by manipulating the document surface 203—thus the user has complete control over the presentation without having to be concerned about ramifications to the data 209, which is being maintained separately in the store 208. Thus, embodiments of the invention allow users to access custom XML information separate from the presentation information.

The one or more data bindings 205 can be used to "bind" content of a data source (XML data 209 in the data store 208), herein termed XML data 209, to locations in the document 204. XML data 209, as used herein, includes any type of content such as text (plain or richly formatted), images, content of a specific type (dates), etc. The structure of a data binding 205 may be described as an XPath link, which allows the word processor application 202 to connect to/synchronize with/persist links to XML nodes 213 in an XML data store 208 associated with a document 204. The XML data store 208 is most preferably a part of the document 204 (i.e. the store 208 is saved to with the word processor file and travels or associates with the particular document 204). A data binding 205 may also contain information to control how the data 209 should be transformed between the presentation (the word processor's document surface 203, for example) and the data store 208. A user of the word processor application 202 can allow the data 209 stored in the data store 208 (the data that is manipulated by the backend applications) to be stored in a standard format, but present the same information in a word processor document 204 in a friendlier format (e.g. the user sees Jan. 29, 2004, but the data is stored in dateTime format as 29-01-004T12:00:00.0000). As another example, the data binding information can contain an image—to the data 209 this image is represented as a seemingly meaningless string of characters, but the same transformation principle described above means that the user will see an image in the content region 207 of the word processor document 204. The user can add/change the image and the XML-encoded representation will be persisted to the XML data 209 so that any backend process can store/manipulate that information.

According to an embodiment, when a user adds data binding information 205 to a content region 207, the user provides the linked XML data 209 of interest (identifying one or more nodes 213, for example) by specifying the XPath expression. Once bound, the content of this content region 207 will be linked or bound to the content (XML data) of the node 213 returned by that XPath. Consequently, this means that if an XML node 213 is added/removed/changed in such a way that the XML node 213 returned by the XPath changes, then the content of the content region 207 in the document 204 updates automatically. Alternatively, if a change occurs which results in no node 213 being returned by a particular data binding 205, then the data binding 205 goes into a 'dangling reference' state, described below.

For example, suppose a document 204 includes the following paragraph, where "Microsoft Corporation" corresponds to a plain text content region 207 (shown in italics) bound to the XPath/contract(1)/header(1)/company(1) in some linked XML data 209 within the data store 208 for that document. The paragraph displayed on the presentation 203 is:

"Microsoft Corporation is located at One Microsoft Way."

According to one embodiment, a link can be set up by specifying a single line of code in a programming environment 206 (for example):

Document.ContentRegions.Add( ).DataBinding.Add("/contract(1)/header(1)/company (1)")

The corresponding linked XML data 209 might look like (with the linked to node 213 depicted in single quotes):

```
<contract>
    <header>
        '<company>Microsoft Corporation</company>'
        <company>Contoso Corporation</company>
    </header>
</contract>
```

Suppose now that a user uses the data store 208 API to add a new <company> node 213 as the first child of <header> (new node 213 in single quotes):

```
<contract>
    <header>
        '<company>Fabrikam Corporation</company>'
        <company>Microsoft Corporation</company>
        <company>Contoso Corporation</company>
    </header>
</contract>
```

The resulting binding 205 on the content region 207 is still bound to the same XPath ("/contract(1)/header(1)/company(1)"), so the document content would immediately update to show the new contents of that node 213:

"Fabrikam Corporation is located at One Microsoft Way."

According to the invention, if one or more regions of a word processor document 204 contain data bound content regions 207, the document 204 reacts to changes to either source of the linked content. Accordingly, if a range of the document 204 is data bound, then changing the contents of the XML node 213 in the associated XML data 209 will result in an automatic change to the text of the content region 207. Correspondingly, if a range of the document 204 is data bound, then changing the text of that bound content region 207 in the document 204, results in an automatic change to the contents of the XML node 213 in the corresponding XML data 209. That is, multiple content regions 207 with identical bindings 205 may exist in multiple places in the document 204. For example, a content region 207 with a data binding 205 to a name may be added to the header as well as the body of a document 204. Changing either of these locations synchronizes that text with the XML data store 208, which will in turn reflect that change wherever a content region 207 with a data binding 205 to that node 213 exists in the document 204.

An XML node 213 in the XML data 209 can have a one-to-many relationship with the document 204, which means that the same XML node 213 in the XML data 209 can be referenced by multiple data bindings 205. Whenever the data bound content region 207 in the document 204 is updated, it causes a change to the appropriate XML node 213 in the XML data 209, which in turn causes all other associated bindings 205 in other content regions 207 in the document 204 to be updated with that new text. For example, suppose a content region 207 in the header of the document 204 contains a data binding 205 specifying the XPath expression for a <title/> node in some XML data 209 and another content region 207 in the body of the document 204 also contains a data binding 205 to that same element. According to the invention, both will display the same content, even though they may have different formatting. If a user edits the content in the content region 207 in the body of the document 204, that update will be persisted to the appropriate XML node 213 in the appropriate XML data 209 in the data store 208, causing all other content regions 207 with associated bindings 205 in the document 204 (e.g. in the header, footer, etc.) which also specify that XML node 213 to update. Embodiments of the invention provide a mechanism for binding multiple locations in the document to a single XML node 213 in the data store 208, now linking the content of all of those locations to a single source of data. Accordingly, the contents of all content regions 207 in the document 204 which are linked to the same node 211 in the XML data 209 are identical.

An illustrative example of this is a typical report document, where the user might normally have the title displayed in several locations: on the cover page (in large bold text), in the header (in smaller text), and in the footer (in smaller italicized text). Normally, the user would have to type out the title in each location, ensuring that if the title is changed in any one of these three locations that they remember to change it in the other two (to keep the content consistent). However, it is all too easy to forget to keep all three of these locations in sync. According to an embodiment of the invention, once a data store 208 is in place that contains XML data 209 that the user wants to display in the document 204, multiple locations in the document (e.g. the three locations discussed above) can all be content regions 207 data bound to a single XML node 213 in the data store 208.

Thus, the content of all three locations are linked or bound to a single source of data 209. This means that the user, by changing the contents of any one of these regions (e.g. the cover page) will automatically cause the user's text to be pushed to the underlying XML data 209, and then in turn pushed to the other locations in the document 204 having content regions 207 with corresponding data bindings 205 (in this case, the header and the footer). This means that the user, insofar as their interaction with the document, has now linked or bound these three ranges of content so that they are all identical. According to the embodiments of the invention, the regions of the document can be presented in multiple ways (large and bold, small and italicized, etc.), but the data structure in the data store 208 remains the same.

Dangling References

According to an embodiment of the invention, users can also specify XPath expressions that do not have a target—their specified target XML node 213 does not exist in the XML data 209 in the data store 208. The data binding 205 does not 'forget' its desired target node 213, rather it goes into a 'waiting' state, where it is not connected to any specific XML data 209, but is waiting to see if the desired node 213 appears in the XML data 209 in the backing XML data store 208. This is particularly useful for document assembly scenarios, where each part of a document 204 (for example, a standard cover page, end page, and reused clauses) may contain data bindings 205 which should only be populated when these parts are assembled into a single final document 204. In this case, the document creator specifies data bindings 205 within content regions 207 in each of the document 'parts' to XML nodes 213 in the XML data 209 which did not exist in that part (for example, the cover page might contain a content region with a binding 205 to a <Title/> XML element and a <Date/> XML element). When the part is viewed outside of its target document, those bindings are not connected, as no XML data 209 exists, but as soon as the part is added to a document which does contain the desired data 209, the data bindings 205 immediately connect (synchronize) to the data 209 and display the correct content—allowing the document creator to specify bindings 205 and save them even though the data 209 has not yet been generated.

One type of dangling reference 215 occurs when a data binding 205 on a content region 207 cannot be successfully linked to a node 213 in a linked XML stream, (i.e. a state of a binding in a content region). When a node 213 is replaced/ removed from a linked XML stream, one or more data bindings 205 may become dangling references 215 as a result. Preferably, if a data binding 205 has a dangling reference 215 due to its XPath, the word processor application 202 continues to store the last known XPath for the node 213 on the data binding 205. This can occur when the XPath no longer resolves to any node 209. Each time the data store 208 messages an update of some XML data 209 to the word processor document 204, the word processor application 202 checks if any dangling references 215 are resolved by the latest update (i.e. the XPath now points to a valid node 213 in the XML tree). If the word processor application 202 resolves a dangling reference, the content of the data store 208 preferably takes precedence over the content currently in the data binding 205—that is, the content of the data binding 205 is replaced by the content in node 213 in the data store 208. Dangling references are preferably exposed using a simple API layer, accessible through one or more programming environments 206.

As an example, suppose a word processor document 204 includes the paragraph below, where Microsoft Corporation corresponds to a plain text content region 207 data bound to the XPath /contract/header/company(3) in some XML data 209:

"Microsoft Corporation is located at One Microsoft Way."

The corresponding XML data 209 might look like (with the linked to node 213 in single quotes):

```
<contract>
  <header>
    <company>Fabrikam Corporation</company>
    <company>Contoso Corporation</company>
    '<company>Microsoft Corporation</company>'
  </header>
</contract>
```

If a user, such as a developer, uses the data store's 208 API to remove the first <company> node 213 under <header> (node 213 in single quotes):

```
<contract>
  <header>
    '<company>Fabrikam Corporation</company>'
    <company>Contoso Corporation</company>
    <company>Microsoft Corporation</company>
  </header>
</contract>
```

The resulting data binding 205 on the content region 207 in the document 204 maintains a link to the same XPath, so the data binding 205 becomes a dangling reference 215 to the now non-existent \contract\header\company(3):

```
<contract>
  <header>
    <company>Ford Corporation</company>
    <company>Intel Corporation</company>
  </header>
</contract>
```

This means that internally we have a broken link, but in accordance with the invention, the content of the content region 207 does not change, and no errors occur, i.e., "Microsoft Corporation is located at One Microsoft Way."

When some XML data 209 is replaced or removed (or when a link is moved from one document to another), then all data bindings 205 which reference that XML data 209 immediately become dangling references 215 pointing to the deleted XML data 209. If a data binding 205 contains a dangling reference 215, the word processor application 202 continues to store the last known XPath/namespace link associated with the data binding 205. According to an embodiment of the invention, when a set of data bindings 205 become dangling references 215, the word processor application 202 attempts to reattach these links to any other available XML data 209 in the associated XML data store 208. If any of the data bindings 205 do resolve to a node 213 in another XML data 209, then all of the dangling references 215 associate to this XML data 209, updating the associated content regions 207 for which data bindings 205 are now connected. If this XML data 209 does not result in valid data bindings 205 for any of the dangling references 215, the word processor application 202 performs a similar check with each XML data 209 in the data store 208, etc. If none of the XML data 209 can be used for the dangling references 215, then the bindings remain dangling references 215 to the original XML data 209.

Figure 3:
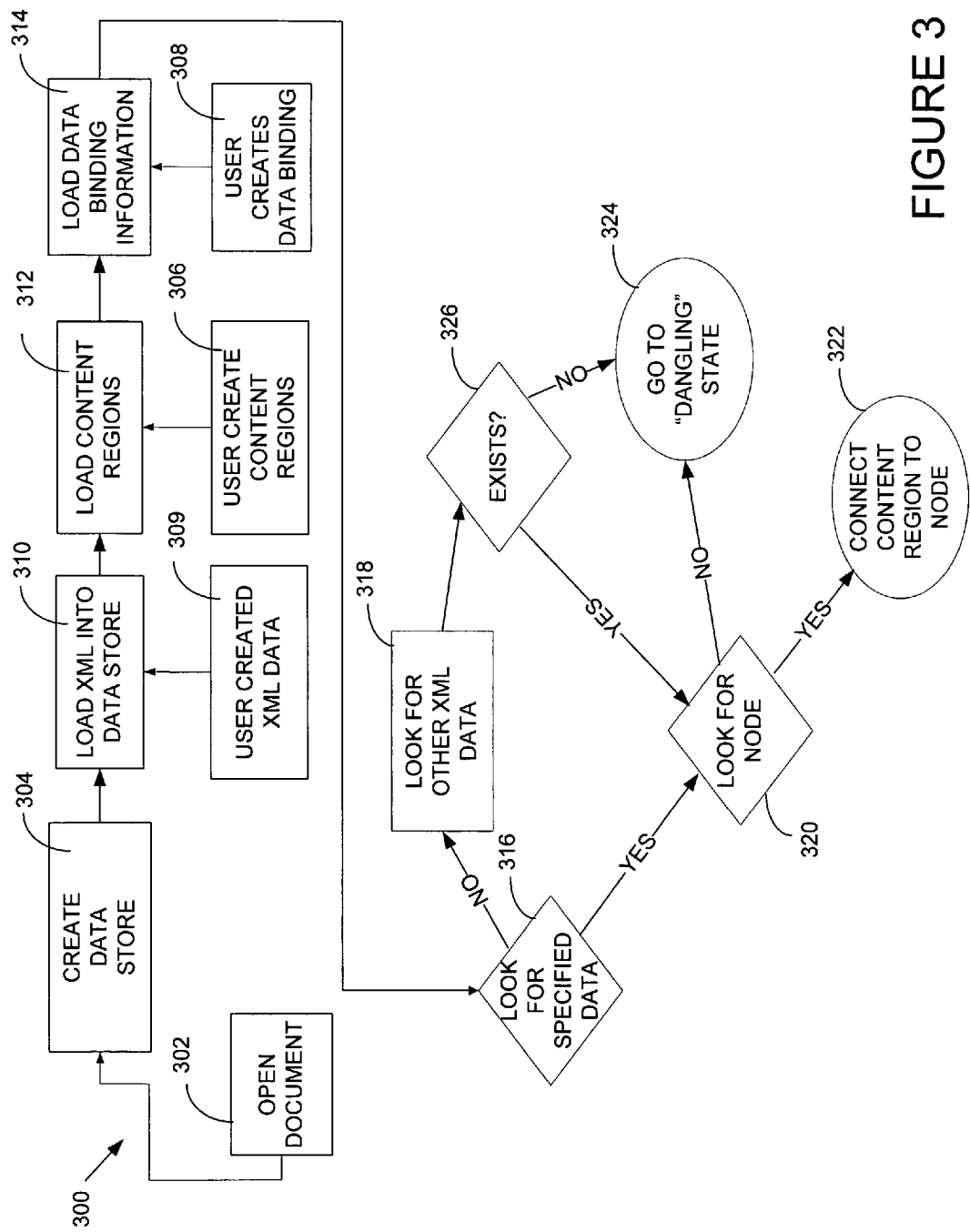
FIG. 3 is a flow diagram according to an embodiment of the present invention.

Referring to the flow diagram depicted in FIG. 3, and with continuing reference to FIG. 2, an embodiment of the invention is described. The process 300 shown in FIG. 3 begins at 302 when a user opens a word processor document 204, using a word processor application 202. At 304, the word processor application creates a data store 208, which is then in 310 populated with any XML data 209 stored in the word processor document 204 or requested by using user interface or programming window 206. The data store 208 is preferably included as part of the document 204, but is not visible on the document editing surface 203. It will be appreciated that the data store 208 may be loaded before creating the content regions 207 and data bindings 205. Likewise, the content regions 207 can be created before the data store 208. In other words, the various operations depicted in FIG. 3 do not have to be carried out in any particular order and can be implemented according to a particular user's preference.

At 306, the user creates one or more content regions 207 which exist on the surface 203 of the document 204. Note that these content regions can also be read from the existing contents of the document 204. At 308, the user can associate data binding information with a content region 207, by providing a particular linked XML data 209 and an XPath expression specifying the target node 213. The one or more data bindings link one or more nodes 213 of XML data 209 in the data store 208 to one or more content regions 207. The data binding 205 becomes bound or dangling. As described above, each node 213 may be bound to a plurality of content regions 207, each one specifying a data binding 205 to the same XML node 213. Moreover, the data bindings 205 may be linked to multiple data stores 208. At 309, the user may create XML data, either in a content region 207 or the date store 208. At 310, the word processor application 202 loads all XML data into a data store 208. At 312, the word processor application 202 loads the content regions 207 from the document 204 or as requested by the user 306, and at 314, the word processor application 202 loads the data bindings 205 from the document 204 or as requested by the user 308. At 316, the word processor application 202 checks to see if the XML data 209 associated with node 213 specified by a particular data binding 205 exists.

If the XML data 209 does not exist, at 318, the word processor application 202 determines whether other XML data 209 exists within the same XML namespace. If the XML data 209 is located within the data store at 316, at 320, the word processor application 202 determines if the associated XML node 213 for the specified XPath exists. If the XPath exists, at 322, the word processor application 202 connects the various document content, i.e. content regions 207 and any other linked content, to the associated XML node or nodes 213 via the data binding. If the XPath is not located at 320, the word processor application 202, at 324, labels the particular data binding 205 as a dangling reference 215 (enters the dangling state). If at 318, other XML data 209 is found in the same XML namespace within the data store 208, at 326, the word processor application 202 again checks to see if the XML node 213 exists within that data.

If the XML data 209 does not exist, the word processor application 202 labels the particular data binding 205 as a dangling reference (enters the dangling state) at 324. If the XML data 209 is found to exist at 326, then at 328, the word processor application 202 searches for the desired XPath within that XML data 209. If the node 213 is found, at 320, the word processor application 202 connects the document content, i.e. content regions 207 and any other linked content, to the associated XML node or nodes 213 at 322.

An illustrative word processor schema is described in application Ser. No. 10/187,060, filed Jun. 28, 2002, entitled "Word-Processing Document Stored in a Single XML File that may be Manipulated by Applications that Understand XML", which is herein incorporated by reference, and includes details on how a word processor application operates to save out contents of a word processor document in XML file format. According to an embodiment of the invention described herein, an XML schema 210 is operable to represent a data binding 205 in a word processor document 204. The word processor application 202 preferably includes a schema 210 which recognizes and acts upon data bindings 205, including defining how data bindings 205 are saved and loaded by the word processor application 202.

In order to store the information associated with the data bindings 205 in the document 204, the XML representation of the word processor environment 200 may include an element as a direct descendant or child of the root element which contains an identifying number and set of associated properties representing the information needed to restore one or more data bindings 205. An example embodiment of this storage might look like:

```
<w:wordDocument>
    <w:dataBindingType
        @ref="<a unique integer for this type>"
        @storeID="<GUID for the relationship to the right part>"
        @selectionNamespaces="<prefix mappings in that part>"
        @rootURI="<root namespace of the part>"/>
    ...rest of document 204 in XML format...
</w:wordDocument>
```

A data binding 205 is preferably a content region property. As shown above, the XML representation includes four properties: "ref", "storeID", "selectionNamespaces", and "rootURI." The ref property establishes a unique ID for the set of properties, which can either be referenced by this reference on the data binding 205, or alternately, stored directly on the data binding 205 within the XML. However, a data binding 205 is not limited to being a content region property—other embodiments of the invention may include creating the data binding on another basic object of the word processor environment (such as a table, paragraph, image, embedded object, etc.) As described above, the properties are alternately stored at a top level or on the data binding 205 directly, allowing the application 202 to locate the proper XML data 209 when a document 204 is opened.

As described above, in one embodiment of the XML storage of the data binding 205, the ref property may be used to point from a content region 207 to the top level data containing the properties needed to link the content region to the XML data 209 when the information for the data binding 205 is not being stored directly on a data binding 205 (see below). The ref property abstracts the information, providing a pointer to the information necessary to resolve a particular XPath, creating the data binding 205.

The "storeID" property provides the unique identification of specific XML data 209 within the data store 208. That is, for each data binding 205, the application 202 needs to find the specific XML data 209 which a data binding 205 was linking to when the document 204 was open. The application 202 places a unique identifier (GUID) on each XML data 209 at save time. The storeID property contains a reference to the GUID. Accordingly, a data store 208 may have multiple XML data 209, each having a unique ID for reference by the application 202.

The "selectionNamespaces" property refers to the prefix mappings to namespaces that are defined by the data 209, (for example, w is used by Word as the prefix for the WordprocessingML namespace). This property contains supplementary information (the prefix mappings) needed to resolve XPath expressions to find nodes 213 in the XML data 209 that are the targets of data bindings 205.

The "rootURI" property refers to the root namespace of the XML data 209 linked to the data binding 205, which also may be referenced if a particular ID does not exist in the XML representation of the data binding 205. For example, when loading a document 204, there may be situations where XML data 209, which was originally data bound, is no longer present (i.e. XML data 209 with the associated ID has been deleted). The rootURI property tells the application 202 to go look for other XML data 209 in this namespace to attempt to re-link a dangling reference when the document 204 is opened.

It is preferred, but not necessary, for a single element (see exemplary schema below) of the schema 210 to encapsulate all of the data binding information for a content region 207. The dataBinding element includes attributes which contain the data binding properties. The XPath attribute, which contains a pointer to a specific XML node 213 in some XML data 209. The storeItemID attribute, which points to specific XML data 209 that is the target of the data binding 209. The prefixMappings attribute stores the mapping table used to find an XML node 213 from an XPath. As described above, the ref attribute allows the preceding the information to be stored centrally and only referenced by the data binding 209.

Moreover, each content region 207 can include the contents of a data binding 205. For example a data binding 205 within a content region 207 with its data binding properties stored centrally may be represented as:
    <w:dataBinding @ref="<ID>" @XPath="<XPath for element in referenced XML data 209>"/>

Thus, the XML schema for the word processor application includes functionality for providing data bindings 205 for content contained in a content region 207 and XML data 209. The schema 210 in one embodiment utilizes two main pieces of information to link to data 209 in a store 208: a reference number points to the central storage of the information needed to locate specific XML data 209 that the word processor application 202 needs to locate when the file utilizing the data binding 205 is opened, and the XPath operator operates to link a specific node within the XML data 209 to one or more content regions 207 in the document 204.

This embodiment as discussed above is part of an exemplary XML schema for a word processor application 202. The exemplary schema may be incorporated as part of a broad-based schema used as part of a word processor application 202, such as the XML schema used for WORD 2003, which is used to represent a word processor document. According to an embodiment of the invention, the schema, among other things, operates to persist information about one or more data bindings 205 associated with one or more content regions 207 in a word processor document 204.

For illustrative purposes, a basic word processor document may include five elements (and a single namespace). It will be appreciated that many more elements are utilized for a word processor document, and the invention is not intended to be limited to any exemplary or illustrative description herein. For a basic word processor document, the five elements include, but are not limited to:

wordDocument element: The root element for a word processor XML document in WordprocessingML.

body element: The container for the displayable text.

p element: A paragraph. There can be any number of paragraphs in the body element.

r element: A run. A contiguous set of word processor XML components inside of a paragraph, with a consistent set of properties.

t element: A piece of text within a run.

Thus, within the word processor document element is everything required to reconstruct the content represented on a computer screen, or other output. The body element contains the content represented on a computer screen, or other output. The body elements may contain a plurality of p-tags for example, wherein each p-tag represents a paragraph within the document 204. A run is essentially defined by any log of continuous text having similar formatting. As used herein, element and tags are used interchangeably.

As an example, a simple word processor XML document 204 may include one paragraph with one run, and one piece of text:

```
<?xml version="1.0"?>
<w:wordDocument
xmlns:w="http://schemas.microsoft.com/office/word/2003/wordml">
    <w:body>
        <w:p>
            <w:r>
                <w:t>The quick brown fox jumped over the lazy dog</w:t>
            </w:r>
        </w:p>
    </w:body>
</w:wordDocument>
```

This simple example illustrates the use of each of basic elements in a word processor XML document 204, and the associated hierarchy of the elements within this structure. When these structures need to contain properties (for example, the formatting properties of a paragraph or run), a properties element is added as the first child element of the object which should include the properties (for example, the first child of <w:p> can be its properties element, <w:pPr>). These are usually of the form <element name>+"Pr". As described herein, a data binding 205 is preferably a content region property.

Thus, using the sample document above and further specifying that the run of text should be bold (a property on the run), the XML would now contain a properties element with that information, i.e.:

```
<?xml version="1.0"?>
<w:wordDocument xmlns:w="namespace-of-word-processing-document">
    <w:body>
        <w:p>
            <w:r>
                <w:rPr> <- the container element for the run properties
                    <w:b @val="on"/> <- bold (a sample run property)
                </w:rPr>
                <w:t>The quick brown fox jumped over the lazy dog</w:t>
            </w:r>
        </w:p>
    </w:body>
</w:wordDocument>
```

Content regions 207 include an XML schema representation including associated properties, one of which is a data binding property, within the context of the word processor XML document structure. Preferably, content regions 207 are additional levels in a word processor XML hierarchy. Most preferably, content regions 207 can surround certain document features, such as runs, paragraphs, etc. As described in the above-referenced application, a user may apply content regions 207 with specific behaviors/properties to regions of a word processor document 204. For example, content regions 207 may be applied to:

One or more complete paragraphs

A selection of text within a paragraph (which, when saved, equates to one or more runs)

Thus, continuing the example above, if a user applied a content region 207 to the word "quick" in the sample document above, the XML schema 210 would define that this must be represented as a new tag in the XML schema 210 that encloses the single run (in this case) which is now enclosed in the content region 207, that is:

```
<?xml version="1.0"?>
<w:wordDocumentxmlns:w="namespace-of-word-processing-document ">
    <w:body>
        <w:p>
            <w:r>
                <w:t>The</w:t>
            </w:r>
            <w:sdt> <- start tag for the content region
                <w:r>
                    <w:t>quick</w:t>
                </w:r>
            </w:sdt> <-end tag for the content region
            <w:r>
                <w:t>brown fox jumped over the lazy dog</w:t>
            </w:r>
        </w:p>
    </w:body>
</w:wordDocument>
```

Note that because the XML schema 210 follows standard XML rules, the restrictions on placement of the content region 207 can be strictly required. For example:

```
<?xml version="1.0"?>
<w:wordDocumentxmlns:w="namespace-of-word-processing-document ">
    <w:body>
```

-continued

```
<w:p>
    <w:r>
        <w:t>The</w:t>
    </w:r>
    <w:sdt> <- start tag for the content region
        <w:r>
            <w:t>quick</w:t>
        </w:r>
        <w:r>
            <w:t>brown fox jumped over the lazy dog</w:t>
        </w:r>
</w:p> <- end tag for the <w:p/> element without closing
one of its children is illegal XML
<w:p>
    </w:sdt> <-end tag for the content region is illegal XML here since
there is no start tag within this <w:p/> element
        <w:r>
            <w:t>paragraph 2</w:t>
        </w:r>
</w:p>
</w:body>
</w:wordDocument>
```

A common user action within a word processor application 202 includes setting desired behaviors on a content region 207, to thereby restrict actions when editing a word processor document 204 according to the original author's specification (i.e. the user who created the one or more content regions 207).

Moreover, when the word processor application 202 saves out these behaviors, which are essentially properties on the content region, as individual elements (each specifying a property) under a single <w:sdtPr> (content region properties) element.

For example, suppose a user wanted to specify a label for a content region 207, that would be saved out in a title property element:
<?xml version="1.0"?>

```
<w:wordDocumentxmlns:w="namespace-of-word-processing-document ">
    <w:body>
        <w:p>
            <w:r>
                <w:t>The</w:t>
            </w:r>
            <w:sdt>
                <w:sdtPr> <- properties element for the content region
                    <w:title @val="Title"/> <- title property
                </w:sdtPr>
                <w:r>
                    <w:t>quick</w:t>
                </w:r>
            </w:sdt>
            <w:r>
                <w:t>brown fox jumped over the lazy dog</w:t>
            </w:r>
        </w:p>
    </w:body>
</w:wordDocument>
```

As described above, a data binding 205 allows a user to specify that content of a content region 207 should be data bound to an XML node 213 in some separate XML data 209 in a word processor document 204. As described above, data binding property provides information about a data binding 205 and operates to re-establish a link to an appropriate node 213 in the appropriate XML data 209 in the data store 208. According to one embodiment, the information may be either stored on each data binding property individually, or stored in a central location in order to reduce duplication and file size.

The first option allows a data binding 209 to be created and edited as a single, unique object. The second option allows many data bindings to be associated with the same XML data 209 to avoid unnecessary data duplication. If data is stored on the data binding property itself (data binding XML in italics):

```
<w:wordDocumentxmlns:w="namespace-of-word-processing-document ">
    <w:body>
        <w:p>
            <w:r>
                <w:t>The</w:t>
            </w:r>
            <w:sdt>
                <w:sdtPr>
                    <w:dataBinding w:storeItemID="{GUID}"
                        w:XPath="\s:memo\s:from\"
                        w:prefixMapping="xmlns:s='memoNamespace'"/>
                </w:sdtPr>
                <w:r>
                    <w:t>quick</w:t>
                </w:r>
            </w:sdt>
            <w:r>
                <w:t>brown fox jumped over the lazy dog</w:t>
            </w:r>
        </w:p>
    </w:body>
</w:wordDocument>
```

This storage includes all of the information required to persist and rebuild the data binding 205 to the XML node 213 in the XML data 209 when the document 204 is opened. Alternately, one might choose to store the information separately in a central location in the XML for the document 204, for example:

```
<w:wordDocumentxmlns:w="namespace-of-word-processing-document ">
    <w:dataBindingType   w:ref="1"   w:storeItemID="{GUID}"
        w:rootURI="memoNamespace"
        w:prefixMapping="xmlns:s='memoNamespace'" />
    <w:body>
        <w:p>
            <w:r>
                <w:t>The</w:t>
            </w:r>
            <w:sdt>
                <w:sdtPr>
                    <w:dataBinding w:ref="1" w:XPath="\s:memo\s:from\"/>
                </w:sdtPr>
                <w:r>
                    <w:t>quick</w:t>
                </w:r>
            </w:sdt>
            <w:r>
                <w:t>brown fox jumped over the lazy dog</w:t>
            </w:r>
        </w:p>
    </w:body>
</w:wordDocument>
```

According to this method of storage, the data binding 205 contains information which is unique to itself, referring to a central storage for information which is potentially shared by many bindings 205. Of course, this information can be included in the XML for the document 204 on both the data binding itself and by reference to another element in the XML for the document 204, in which case the local information on the binding would take precedence (allowing for individual overriding of global settings on a per-binding basis):

```
<w:wordDocumentxmlns:w="namespace-of-word-processing-document ">
  <w:dataBindingType    ref="1"    w:storeItemID="{GUID}"
      w:rootURI="memoNamespace"
      w:prefixMapping="xmlns:s='memoNamespace'" />
  <w:body>
    <w:p>
      <w:r>
        <w:t>The</w:t>
      </w:r>
      <w:sdt>
        <w:sdtPr>
          <w:dataBinding    w:ref="1"
                  w:storeItemID="{otherGUID}"
                  w:XPath="\s:memo\s:from\"/>
                ^^ storeItemID is overridden
```
```
        </w:sdtPr>
        <w:r>
          <w:t>quick</w:t>
        </w:r>
      </w:sdt>
      <w:r>
        <w:t>brown fox jumped over the lazy dog</w:t>
      </w:r>
    </w:p>
  </w:body>
</w:wordDocument>
```

As a further illustration of aspects of the invention, the following is an exemplary schema 210 for content regions 207 and data bindings 205:

```
<xsd:complexType name="CT_DBBehavior">
    <xsd:attribute name="protectBoundary" type="ST_OnOff" x:comment="are the boundary characters protected or not"/>
    <xsd:attribute name="protectContent" type="ST_OnOff" x:comment="are the contents of the tag protected or not"/>
    <xsd:attribute name="displayAsPicture" type="ST_OnOff" x:comment="are the contents interpretted as uu-encoding or not"/>
</xsd:complexType>
<xsd:simpleType name="ST_Lock" x:comment="locking semantics for an sdt">
    <xsd:restriction base="xsd:string">
        <xsd:enumeration value="sdt-locked" />
        <xsd:enumeration value="content-locked" />
        <xsd:enumeration value="unlocked" x:default="true" />
        <xsd:enumeration value="sdt-content-locked" />
    </xsd:restriction>
</xsd:simpleType>
<xsd:complexType name="CT_Lock">
    <xsd:attribute name="val" type="ST_Lock"    x:comment="Defines the locking properties associated with this sdt"/>
</xsd:complexType>
<xsd:complexType name="CT_SdtListItem">
    <xsd:attribute name="displayText" type="ST_String"    x:comment="The text to display. If absent, then the value will be shown"/>
    <xsd:attribute name="value" type="ST_String"    x:comment="The value to insert into the document when the item is selected"/>
    <xsd:attribute name="order" type="ST_DecimalNumber" x:comment="The order in which to show the items. The dropdown will be sorted by all 'order' values. Collisions will be arbitrarily resolved"/>
</xsd:complexType>
<xsd:complexType name="CT_SdtDate">
    <xsd:sequence>
        <xsd:element name="dateFormat" type="CT_String" x:comment="The display format for this date -- this uses the standard windows datetime picture (eg: mm/dd/yy, etc)"/>
    </xsd:sequence>
</xsd:complexType>
<xsd:complexType name="CT_SdtComboBox">
    <xsd:sequence>
        <xsd:element name="listItem" type="CT_SdtListItem" x:comment="A list item in the combobox"/>
    </xsd:sequence>
</xsd:complexType>
<xsd:complexType name="CT_SdtDocPartList">
    <xsd:sequence>
        <xsd:element name="docPartCategory" type="CT_String"    x:comment="The category of document parts that should be provided as choices for this sdt"/>
    </xsd:sequence>
</xsd:complexType>
<xsd:complexType name="CT_SdtDropDownList">
    <xsd:sequence>
        <xsd:element name="listItem" type="CT_SdtListItem" x:comment="A list item in this dropdown box"/>
    </xsd:sequence>
</xsd:complexType>
<xsd:simpleType name="ST_PictureStorageType">
    <xsd:restriction base="xsd:string">
        <xsd:enumeration value="link" />
        <xsd:enumeration value="embed" />
```

```
      </xsd:restriction>
    </xsd:simpleType>
    <xsd:complexType name="CT_PictureStorageType">
      <xsd:attribute name="val" type="ST_PictureStorageType" x:comment="The storage type for this picture"/>
    </xsd:complexType>
    <xsd:complexType name="CT_SdtPicture">
      <xsd:sequence>
        <xsd:element name="pictureStorageType" type="CT_PictureStorageType" x:comment="The storage type for this picture"/>
      </xsd:sequence>
    </xsd:complexType>
    <xsd:complexType name="CT_Placeholder">
      <xsd:sequence>
        <xsd:element name="docPart" type="ST_String" x:comment="This is the name of the doc part that represents the placeholder text when this sdt is empty"/>
      </xsd:sequence>
    </xsd:complexType>
    <xsd:complexType name="CT_DataBinding">
      <xsd:attribute name="prefixMappings" type="ST_String" x:comment="Defines the prefix->namespace mappings for the xpath"/>
      <xsd:attribute name="xpath" type="ST_String" use="required" x:comment="The xpath to the data source for this databinding"/>
      <xsd:attribute name="storeItemID" type="ST_String" use="required" x:comment="This is the itemID of the store item that we are linked to"/>
    </xsd:complexType>
    <xsd:complexType name="CT_SdtPr">
      <xsd:sequence>
        <xsd:element name="alias" type="CT_String" x:comment="The alias (friendly name) for this sdt"/>
        <xsd:element name="invalidIfBlank" type="CT_OnOff" x:comment="Is this sdt flagged as an error if it contains no content?"/>
        <xsd:element name="lock" type="CT_Lock" x:comment="Defines the locking properties assoiated with this sdt" x:dispatch-begin="HrDispatchWSdtLock(pxin, pAttr)"/>
        <xsd:element name="placeholder" type="CT_Placeholder" x:comment="Defines the placeholder properties associated with this sdt"/>
        <xsd:element name="dataBinding" type="CT_DataBinding" x:comment="Defines the databinding properties for this sdt" x:dispatch-begin="HrDispatchWDataBindingSource(pxin, pAttr)"/>
        <xsd:choice minOccurs="0" maxOccurs="1">
          <xsd:element name="comboBox" type="CT_SdtComboBox" x:comment="Restricts the content of this sdt to a combobox and defines the combobox properties for this sdt"/>
          <xsd:element name="date" type="CT_SdtDate" x:comment="Restricts the content of this sdt to a date (or rather, attempts to coerce the content of this sdt into a date and reports an error if it cannot be coerced"/>
          <xsd:element name="docPartList" type="CT_SdtDocPartList" x:comment="Restricts the content of this sdt to a DocPart"/>
          <xsd:element name="dropDownList" type="CT_SdtDropDownList" x:comment="Restricts the content of this sdt to a dropdown list"/>
          <xsd:element name="picture" type="CT_SdtPicture" x:comment="Restricts the content of this sdt to a picture" x:dispatch-begin="HrDispatchWSdtPicture(pxin, pAttr)"/>
          <xsd:element name="richText" type="CT_Empty" x:comment="Allows the content of this sdt to be rich text (unrestricted)"/>
          <xsd:element name="table" type="CT_SdtTable" x:comment="Restricts the content of this sdt to a table"/>
          <xsd:element name="text" type="CT_Empty" x:comment="Restricts the content of this sdt to a single paragraph text block. This does not include the paragraph mark"/>
        </xsd:choice>
      </xsd:sequence>
    </xsd:complexType>
    <xsd:complexType name="CT_SdtContent">
      <xsd:choice minOccurs="1" maxOccurs="unbounded">
        <xsd:element name="r" type="CT_R" x:comment="Run element. This is the leaf container for data in a document -- text, pictures, etc"/>
        <xsd:group ref="runLevelElts"/>
      </xsd:choice>
    </xsd:complexType>
    <xsd:complexType name="CT_Sdt">
      <xsd:sequence>
        <xsd:element name="sdtPr" type="CT_SdtPr" minOccurs="0" maxOccurs="1" x:comment="These properties define the specific behaviors of this structured document tag"/>
        <xsd:element name="sdtContent" type="CT_SdtContent" minOccurs="0" maxOccurs="1" x:comment="This is the content of the sdt. If it is data bound, then it is a cached result of the last update of the databinding"/>
```

```
    </xsd:sequence>
</xsd:complexType>
```

Summarizing, when creating one or data bindings 205, a user opens a new or existing document 204 using the word processor application 202. The user may create a content region 207 in the document 204. As part of creating the content region 207, a user may also define what properties are associated with the content region 207, including any data 209 to be data bound. The user supplies the data binding 205 information, including linking information and the XPath which is stored within the data binding 205 as a property on the content region 207. When the word processor application 202 loads the particular file from a store, such as the hard drive, it recognizes the content regions 207. It also recognizes, via the data binding property, that certain content associated with a content region 207 needs to be synchronized with separate data 209 in the XML data store 208. Whenever data 209 changes or the XML data store changes, the application recognizes that it needs to change the content of the content region 207 with the content of changed XML data 209.

Figure 4:
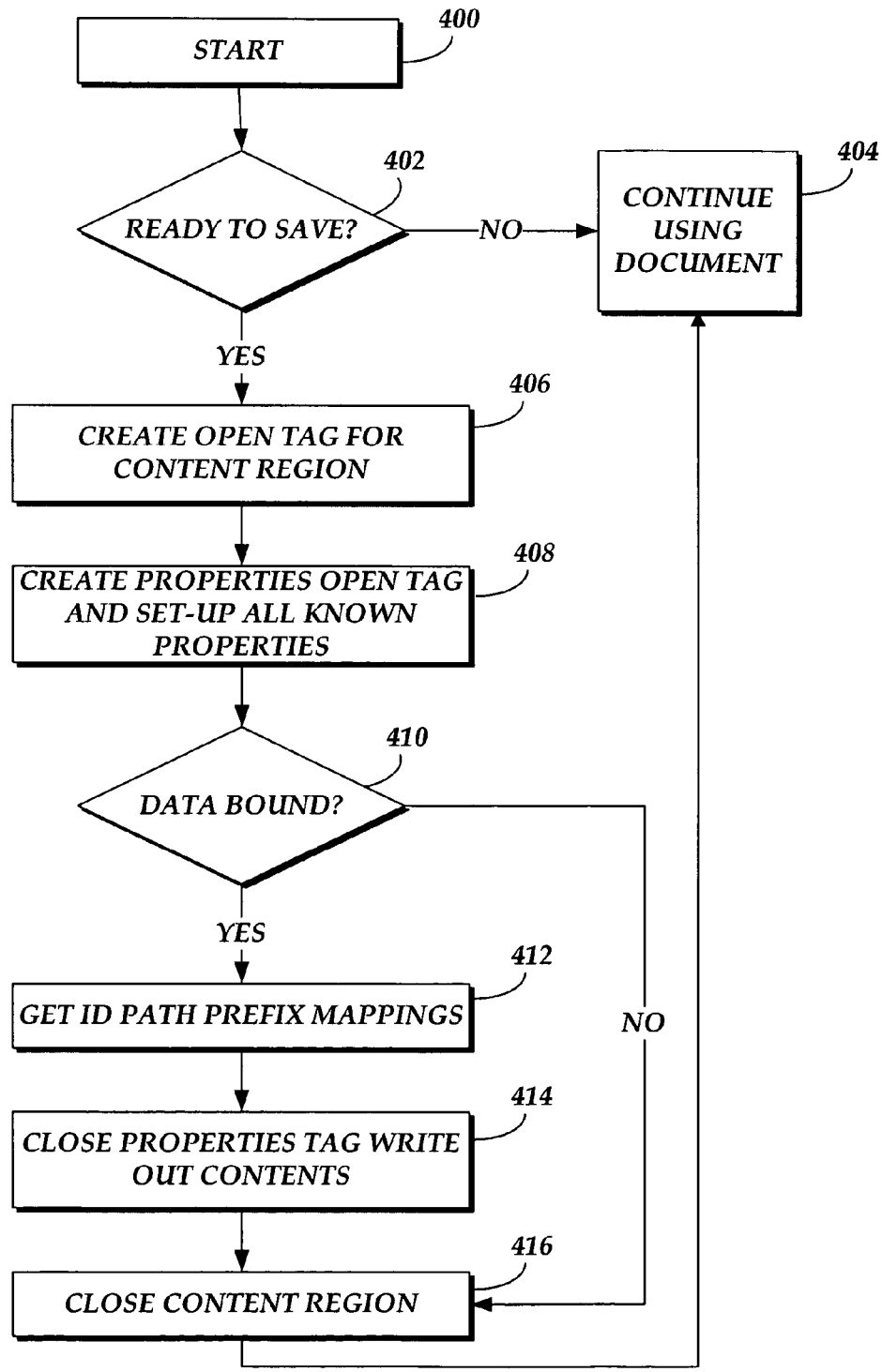
FIG. 4 is another flow diagram according to an embodiment of the present invention.

A user typically saves a word processor document 204 after editing or other manipulation using the word processor application 202. FIG. 4 is a flow diagram depicting an exemplary process for saving the word processor document 204. The process begins at 400. At 402, it is determined whether it is time to save the document 204. A document save may be the result of a user action (CTRL-S, etc.) or automatic process. If it is not time to save, at 404, the user may continue using the document 204. If it is time to save, at 406, the application 202 creates an open tag for a content region 207. At 408, the application 202 creates a properties open tag, and sets up all known properties for the content region 207. At 410, the application 202 determines if a content region 207 is data bound. If the content region 207 is data bound, at 412, the application obtains the ID of the XML data 208, the associated XPath, prefix mappings, and saves. At 414, the application 202 closes the properties tag, writes out current document content in the content region 207. At 416, the application 202 closes the content region 207. Preferably, data binding 205 information may be either in the properties tags or at the root level.

Figure 5:
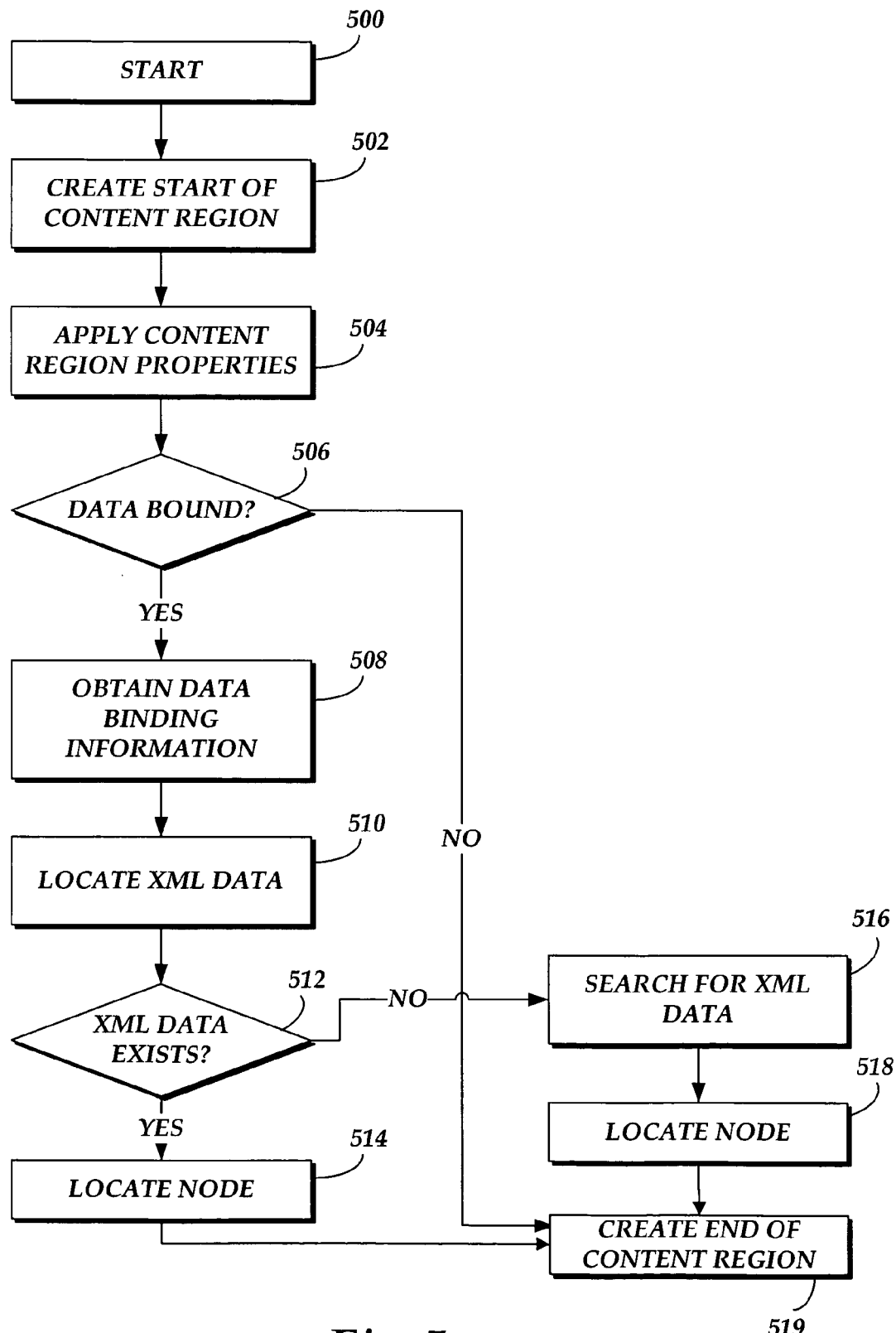
FIG. 5 is yet another flow diagram according to an embodiment of the present invention.

FIG. 5 is a flow diagram depicting an exemplary process for loading a word processor document 204 starting at 500. At 502, upon seeing a content region tag, the application 202 creates the start of a content region 207. At 504, the application 202 applies the content region properties as specified in the properties element of the content region. At 506, the application 202 determines whether the content region 207 is data bound. If the content region 207 is data bound, at 508, the application 202 obtains the data binding information (from properties or root), otherwise, at 519, the application 202 creates the end of the content region 207. At 510, the application 202 preferably uses the ID to locate the associated XML data 209. If the XML data 209 exists, at 512, the application 202 locates the node 213 at 514. If the XML data 209 does not exist, at 516, the application 202 searches for other XML data 209 having the same root namespace. At 518, the application 202 uses the XPath and prefix map to locate the proper node 213. If the node exists, the data binding 205 is live. If the node does not exist, the data binding 205 is dangling. At 519, the application creates the end of the content region 207.

As an example, XML data 209 might include the following:

```
<s:memo>
    <s:to>John Smith</s:to>
    <s:from>Mary Doe</s:from>
</s:memo>
```

An XML document 204 might include:

```
<s:memo>
    <s:to>John Smith</s:to>
    <s:from>Mary Doe</s:from>
</s:memo>
    An XML document 204 might include:
<w:wordDocumentxmlns:w="namespace-of-word processing-document ">
    <w:body>
        <w:p>
            <w:r>
                <w:t>Message From:</w:t>
            </w:r>
            <w:sdt>
                <w:sdtPr>
                    <w:dataBinding    w:ID="{1234567890}"
                        w:XPath="\s:memo\s:from\"
                        w:prefixMapping="xmlns:s='memoNamespace'"/>
                </w:sdtPr>
                <w:r>
                    <w:t>Mary Doe</w:t>
                </w:r>
            </w:sdt>
        </w:p>
    </w:body>
</w:wordDocument>
```

The data binding 205 includes a reference to the unique ID for the associated XML data 209, the XPath of the target node 213, and any necessary prefix mappings.

It should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations making up the embodiments of the present invention described herein are referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable storage medium having stored instructions that are executed by a computer for performing steps:
providing a schema for generating a data binding, wherein the generating the data binding is to link specified extensible markup language (XML) data maintained in an XML data store to one or more content region or more content regions in a document to present the specified XML data;
identifying a set of properties including:
a first property for associating a unique identifier with the set of properties;
a second property for associating a set of prefix mappings with the data binding used to resolve XPath expressions to find target nodes in the specified XML data;
a store property for identifying a set of XML data within the XML data store and storing the XML data linked to the one or more content region or more content regions by the data binding;
a namespaces property for associating one prefix mapping or more prefix mappings to namespaces to identify a node of the XML data linked by mapping the data binding to the one content region or more content regions;
a third property for associating a root namespace of the XML data with the data binding;
a fourth property for identifying a globally unique identifier (GUID) for the XML data store of the XML data; and
a fifth property for including information to re-link a dangling reference;
defining, using the schema, how the data binding is saved and loaded;
storing, using the schema, information in a central location to reduce duplication and file size;
storing a last known XPath for the node on the data binding if the data binding has a dandling reference due to the data binding's XPath; and
creating a properties open tag for the content region, if the content region is data bound, saving the identifier of the XML data, an associated XPath and the prefix mappings, otherwise, creating the end of the content region.

2. The computer-readable storage medium of claim 1, wherein the first property associated data in a data store with the unique identifier.

3. The computer-readable storage medium of claim 1, wherein the second property contains supplementary information used to resolve XPath expressions to find target nodes in the XML data.

4. The computer-readable storage medium of claim 1, wherein the schema utilizes an XPath operator to link a data node to one or more content regions.

5. The computer-readable storage medium of claim 1, wherein the schema operates to persist information about one or more data bindings associated with one or more content regions.

6. A method for binding data using one or more data bindings, the method comprising:
at a computer, providing a schema for generating a data binding, wherein the generating the data binding is to link specified extensible markup language (XML) data maintained in an XML data store to one content region or more content regions in a document to present the specified XML data;
identifying a set of properties including:
a first property for associating a unique identifier with the set of properties;
a second property for associating a set of prefix mappings with the data binding used to resolve XPath expressions to find target nodes in the specified XML data;
a store property for identifying a set of XML data within the XML data store and storing the XML data linked to the one content region or more content regions by the data binding;
a namespaces property for associating one or more prefix mappings to namespaces to identify a node of the XML data linked by mapping the data binding to the one content region or more content regions;
a third property for associating a root namespace of the XML data with the data binding;
a fourth property for identifying a globally unique identifier (GU ID) for the XML data store of the XML data, wherein the set of properties are stored in a computer readable storage medium; and
a fifth property for including information to re-link a dangling reference; defining, using the schema, how the data binding is saved and loaded; storing, using the schema, information in a central location to reduce duplication and file size;
if the data binding has a dandling reference due to the data binding's XPath, storinci a last known XPath for the node on the data binding; and
creating a properties open tag for the content region, if the content region is data bound, saving the identifier of the XML data, an associated XPath and the prefix mappings, otherwise, creating the end of the content region.

7. The method of claim 6, further comprising using an XPath operator to link the node of XML data to one or more content regions.

8. The method of claim 6, further comprising using the schema to persist information about one or more data bindings associated with one or more content regions.

9. The method of claim 6, further comprising using the schema to store information using each data binding property to thereby allow a data binding to be created and edited as a single object.

10. A system for binding data using one or more data bindings, the system comprising:
a computer that includes a processor;
a computer readable storage medium embodied instructions for:
providing a schema for generating a data binding, wherein the generating the data binding is to link specified extensible markup language (XML) data maintained in an XML data store to one content region or more content regions in a document to present the specified XML data;
identifying a set of properties including:
a first property for associating a unique identifier with the set of properties;
a second property for associating a set of prefix mappings with the data binding used to resolve XPath expressions to find target nodes in the specified XML data;
a store property for identifying a set of XML data within the XML data store and storing the XML data linked to the one content region or more content regions by the data binding;

a namespaces property for associating one or more prefix mappings to namespaces to identify a node of the XML data linked by mapping the data binding to the one content region or more content regions;

a third property for associating a root namespace of the XML data with the data binding;

a fourth property for identifying a globally unique identifier (GUID) for the XML data store of the XML data; and a fifth property for including information to re-link a dangling reference; defining, using the schema, how the data binding is saved and loaded; storing, using the schema, information in a central location to reduce duplication and file size;

if the data binding has a dandling reference due to its XPath, storing a last known XPath for the node on the data binding; and creating a properties open tag for the content region, if the content region is data bound, saving the identifier of the XML data, an associated XPath and the prefix mappings, otherwise, creating the end of the content region.

11. The system of claim 10, wherein the first property points to top level data containing a unique identifier when the unique identifier is not stored on a data binding.

12. The system of claim 10, wherein the second property associates data in a XML data store with the unique identifier.

13. The system of claim 10, wherein the third property contains supplementary information used to resolve XPath expressions to find target nodes in the XML data.

14. The system of claim 10, wherein the schema operates to persist information about one or more data bindings associated with one or more content regions.

* * * * *